2 Sheets—Sheet 1.

A. L. HUDSON.
Photographic Camera.

No. 201,248. Patented March 12, 1878.

Witnesses.
Otto Stefeland
Hugo Brueggemann

Inventor.
Augustus L. Hudson
by
Van Santvoord & Hauff
his attorneys

2 Sheets—Sheet 2.

A. L. HUDSON.
Photographic Camera.

No. 201,248. Patented March 12, 1878.

Witnesses
Otto Anfeld and
Hugo Brueggemann

Inventor
Augustus L. Hudson
by
Van Santvoord & Hauff
his attorneys

UNITED STATES PATENT OFFICE.

AUGUSTUS L. HUDSON, OF HINGHAM, MASSACHUSETTS.

IMPROVEMENT IN PHOTOGRAPHIC CAMERAS.

Specification forming part of Letters Patent No. 201,248, dated March 12, 1878; application filed January 12, 1878.

*To all whom it may concern:*

Be it known that I, AUGUSTUS L. HUDSON, of Hingham, in the county of Plymouth and State of Massachusetts, have invented a new and useful Improvement in Photographic Cameras, which improvement is fully set forth in the following specification, reference being had to the accompanying drawings, in which—

Figure 1:
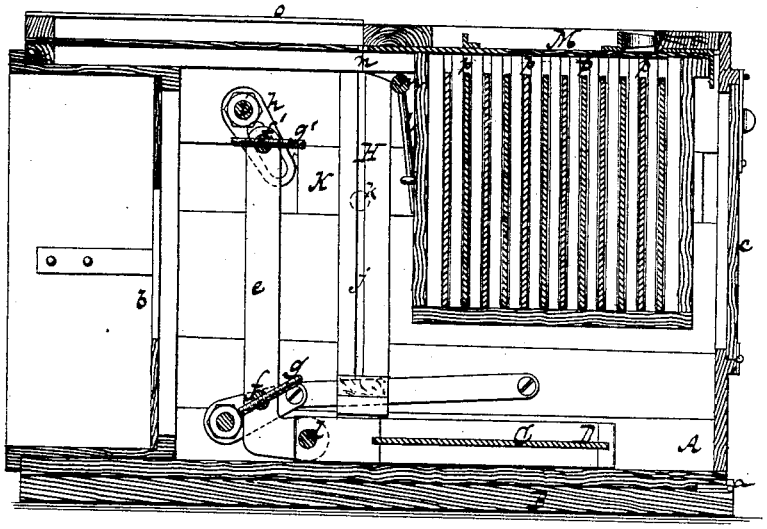
Figure 2:
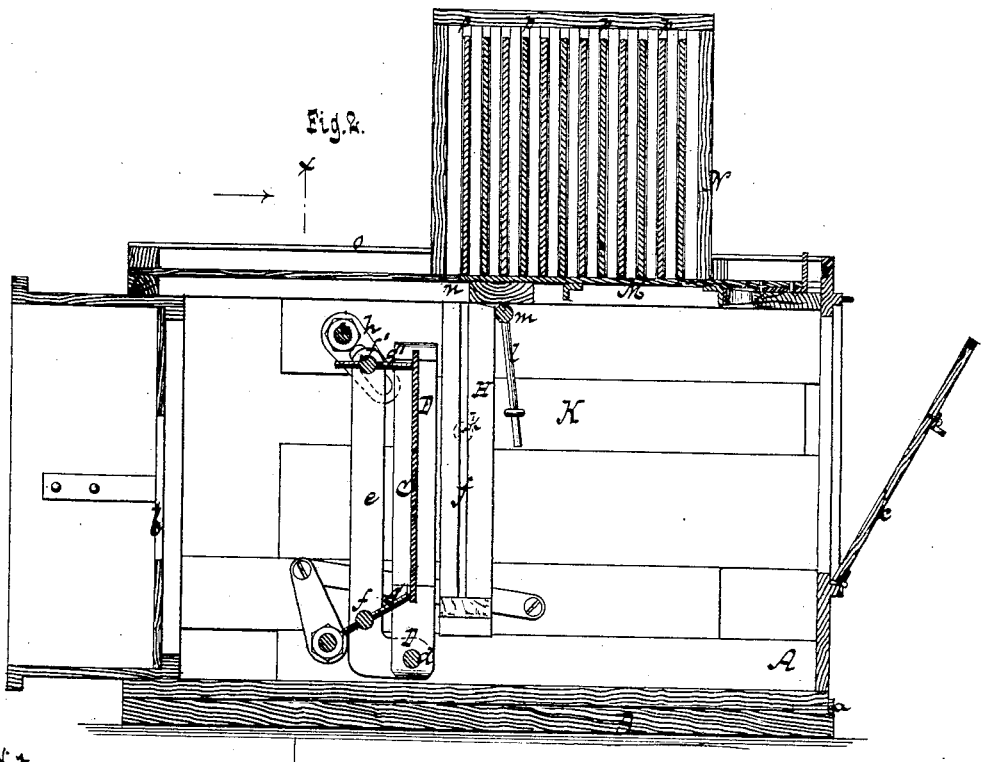
Figure 3:
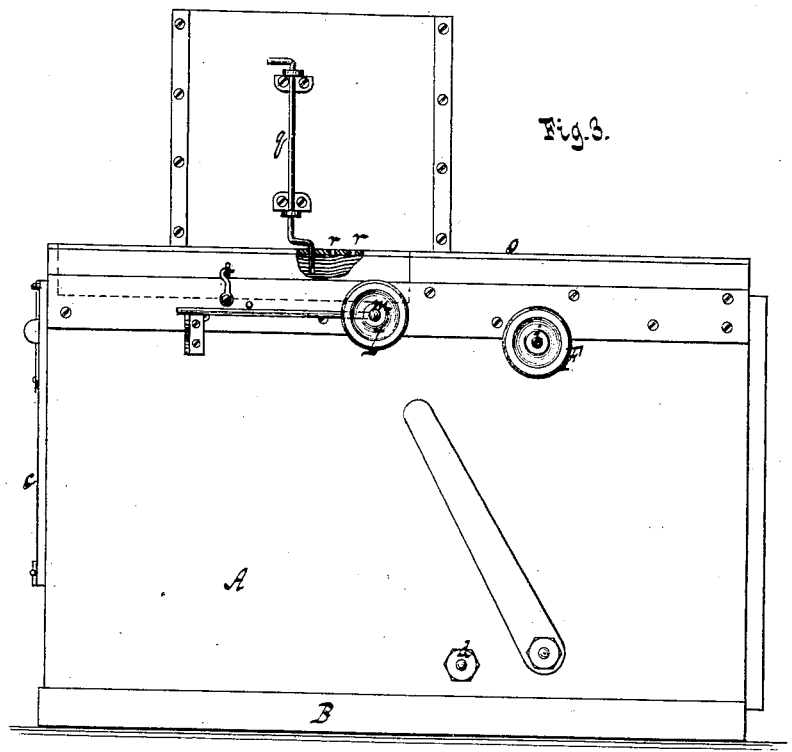
Figure 4:
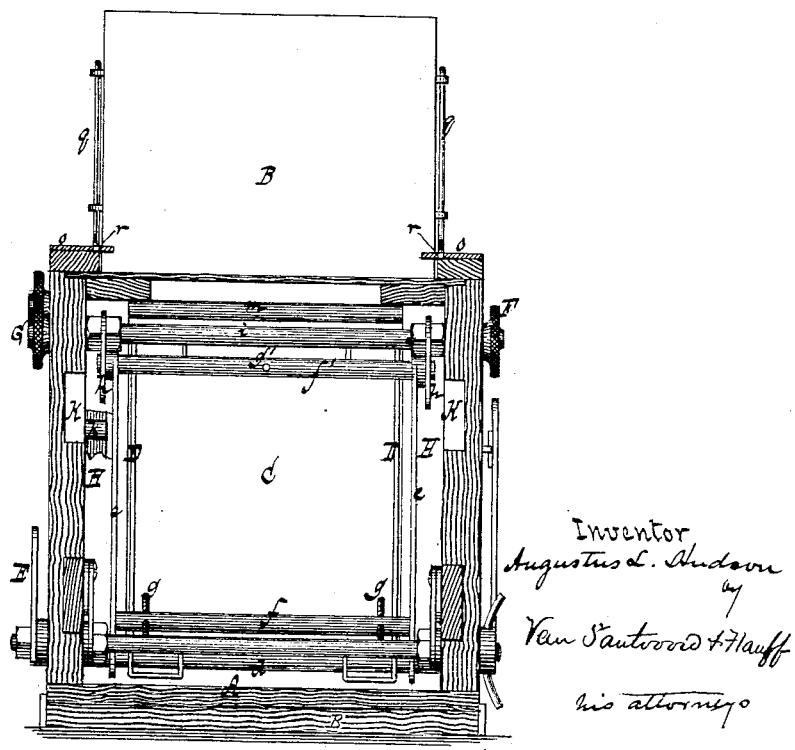

Figure 1 represents a longitudinal vertical section when the camera is arranged for transportation. Fig. 2 is a similar section when the camera is arranged for use. Fig. 3 is a side elevation; and Fig. 4 is a transverse section in the plane $x\,x$, Fig. 2.

Similar letters indicate corresponding parts.

This invention consists in the combination, in a photographic camera, of a camera-box containing guide-bars for the reception of the sensitive plates; a drop-box fitted into guideways in the top of the camera-box, and provided with grooves for the reception of one or more sensitive plates; a sliding bottom fitted to the drop-box, and bolts arranged upon the sides of said drop-box, and adapted to take into perforations or catches in the guide-bars, and retaining the drop-box in the required position, so that the sensitive plates, after having been placed into the drop-box, are perfectly protected from the light, and that the same can be dropped into the camera-box, exposed to the object, and returned into the drop-box after having been exposed for the proper length of time, and thereby the operation of taking photographic pictures on dry plates is materially facilitated; also, in the combination, with a camera-box and with its ground-glass holder, of three or more points projecting from an adjustable frame, which serves to bring the same in contact with the ground glass after the same has been adjusted in the required position, and an adjustable guide-frame for the reception of the sensitive plate, so that by means of the three points and the ground glass the sensitive plate can be readily adjusted in the required position to retain vertical lines when the camera-box is tipped up or down.

In the drawings, the letter A designates a camera-box, which is connected to the base B by a hinge-joint, $a$, so that it can be brought in an inclined or in a horizontal position, or that it can be turned upside down, as will be hereinafter more fully explained. In the front of this box is an opening, $b$, for the reception of the lens, and in its rear end is a door, $c$, which opens downward, and which allows of adjusting the camera in the proper position by means of the ground glass C. This ground glass is secured in a frame or holder, D, which is firmly attached to a rock-shaft, $d$, that extends transversely across the camera-box near its bottom, and is provided with a handle, E, Fig. 4, by means of which it can be turned so as to raise the ground glass from the position shown in Fig. 1 to that shown in Fig. 2.

On the rock-shaft $d$ are loosely mounted two bent levers, $e\,e$, which are connected by two traverses, $f\,f'$, in the lower one of which are secured two points or abutments, $g\,g$, while the upper traverse carries one such abutting-point, $g'$, and extends through the levers $e\,e$, so as to engage with slotted arms $h$, which are firmly mounted on a rock-shaft, $i$. This rock-shaft is turned by a finger-button, F, and it can be fastened in the desired position by a clamping-nut, G, Fig. 4.

By turning the rock-shaft $i$ the abutting-points $g\,g'$ can be brought in contact with the face of the ground glass.

The sensitive plate is placed into guide-grooves $j$, formed in two bars, H H, which are situated on the opposite sides of the camera-box, and connected by pivots $k\,k$ to slides fitted into horizontal grooves in the sides of the camera-box. These slides connect, by means of rods $l$, with a rock-shaft, $m$, that can be turned by a finger-button, L.

By means of the abutting-points $g\,g'$ and the grooved pivoted bars H H, which receive the sensitive plate, I am enabled to bring the sensitive plate in the exact position previously occupied by the ground glass; and if the ground glass has to be placed in an inclined position in order to preserve vertical lines in the picture, the sensitive plate, on being brought in contact with the three points $g\,g'$, which are adjusted to correspond to the position of the ground glass, will be in the proper position to preserve vertical lines in the picture.

By turning the rock-shaft $m$ to the position shown in Figs. 1 and 2, the grooves in the bars H H are brought beneath an opening, $n$, in the top of the camera-box, through which the sensitive plate can be introduced.

The opening $n$ is closed by a slide, M, which forms the bottom of the drop-box N, Fig. 2. This drop-box is fitted into guideways $o\ o$ in the top of the camera-box, and it is provided with a series of grooves, $p\ p$, for the reception of a number of sensitive plates.

On the sides of the drop-box are bolts $q$, which engage with holes $r$ in the guideways $o\ o$, so as to lock the drop-box in the required position; and the holes $r$ correspond to the grooves $p\ p$, so that either pair of said grooves can be brought over the opening $n$ in the top of the camera-box.

If the drop-box has been locked in the guideways, and the slide M is drawn back, the sensitive plate, situated at the moment over the opening $n$, drops down into the grooved bars H H, and after the same has been exposed for the proper length of time it can be returned into the drop-box by turning the camera-box upside down. This operation can be effected by swinging the camera-box back on its hinges $a\ a$ to the required position.

It will be seen from this description that the sensitive plates, while situated in the drop-box, are perfectly excluded from the light, and by means of said drop-box a number of sensitive plates can be introduced successively into the camera-box without bringing them in contact with light, except during the time of exposure in the camera-box. The slide M is exposed to the action of a spring, $s$, so that it closes automatically.

For the purpose of transportation the drop-box is turned upside down to the position shown in Fig. 1.

Cameras have heretofore been provided with drop-boxes for holding the sensitive plates, and adapted to slide and drop the plates into grooves in the camera-box, and I do not claim such arrangement, broadly.

What I claim as new, and desire to secure by Letters Patent, is—

1. The combination, with a photographic camera-box having on its top the perforated guide-bars $o$, of the drop-box N, provided with grooves for holding the sensitive plates, and having bolts $q$, arranged to take into the perforations of the guide-bars, and the slide M, substantially as and for the purpose set forth.

2. The combination, with a camera-box and with its ground-glass holder, of three or more points projecting from an adjustable frame, which serves to bring said points in contact with the ground glass after the same has been adjusted in the required position, and an adjustable frame for the reception of the sensitive plates, all constructed and adapted to operate substantially as and for the purpose set forth.

In testimony that I claim the foregoing I have hereunto set my hand and seal this 5th day of January, 1878.

AUGUSTUS L. HUDSON. [L. S.]

Witnesses:
  QUINCY BICKNELL,
  WILLIAM HUDSON.